United States Patent [19]

Clark et al.

[11] Patent Number: 5,544,270

[45] Date of Patent: Aug. 6, 1996

[54] MULTIPLE TWISTED PAIR DATA CABLE WITH CONCENTRIC CABLE GROUPS

[75] Inventors: William T. Clark, Leominster; Joseph Dellagala, Shrewsbury, both of Mass.

[73] Assignee: Mohawk Wire and Cable Corp., Leominster, Mass.

[21] Appl. No.: 400,094

[22] Filed: Mar. 7, 1995

[51] Int. Cl.⁶ .................................................. H01B 11/22
[52] U.S. Cl. .......................... 385/101; 174/27; 174/70 A
[58] Field of Search ..................... 385/101, 100, 385/109, 102, 104, 106–114; 174/36, 34, 102 SC, 113 R, 70 A, 27, 105 R

[56] References Cited

U.S. PATENT DOCUMENTS

| | | | |
|---|---|---|---|
| 5,180,884 | 1/1993 | Aldissi | 174/36 |
| 5,214,243 | 5/1993 | Johnson | 174/36 |
| 5,216,204 | 6/1993 | Dudek et al. | 174/102 SC |
| 5,418,878 | 5/1995 | Sass et al. | 385/101 |
| 5,434,354 | 7/1995 | Baker et al. | 174/36 |

Primary Examiner—John D. Lee
Assistant Examiner—Phan T. H. Palmer
Attorney, Agent, or Firm—Wolf, Greenfield & Sacks, P.C.

[57] ABSTRACT

A high-speed data communications cable has concentric groupings of twisted pair wires. A first grouping is formed about a filler and enclosed within a thermoplastic jacket. A secondary grouping is formed in a single layer about the thermoplastic jacket of the first grouping. A third grouping may be formed about the jacket of the second grouping. Secondary fillers are used with the twisted pair wires for placement control. A minimal number of lay lengths is used in each grouping.

20 Claims, 1 Drawing Sheet

MULTIPLE TWISTED PAIR DATA CABLE WITH CONCENTRIC CABLE GROUPS

BACKGROUND OF THE INVENTION

1. Field of the Invention

The present invention relates to high-speed data communication cables using twisted pair wires. More particularly, it relates to cables having groups of twisted pair wires.

2. Discussion of Related Art

Cables for high-speed data communications typically consist of multiple twisted pair wires. As the number of pairs increases, pair-to-pair crosstalk becomes a difficulty. As crosstalk increases, the data integrity diminishes and data can become lost. The industry has set certain standards for crosstalk, including powersum crosstalk as defined in the latest standard, EIA/TIA-568-A. Various cable configurations have been used in order to reduce crosstalk and meet the industry standards.

In one implementation, the twisted pair wires are separated into small groups which are insulated and cabled together. In a second design groups of wire pairs are formed around fillers, generally having a tubular construction. Each of the groups is laid side-by-side in an outer jacket forming an oval. Another design includes five groupings of wire pairs around fillers which are cabled together in a jacket having a star type configuration.

These configurations are difficult to use. The non-round configurations limit flexibility and hinders installation in conduits and around bends. The additional fillers used with each group increases the size of the cable. Also, the, positioning of the various groups hinders separating pairs of wires for making connections.

Therefore, a need exists for a cable having multiple twisted pair wires with limited crosstalk and improved handling capabilities.

SUMMARY OF THE INVENTION

The present invention overcomes the deficiencies of prior cable designs by providing concentric groups of twisted pair wires cabled together. In one aspect of the invention, an inner core grouping of twisted pairs is formed around a filler and cabled together within a thermoplastic jacket. A second grouping of twisted pairs is formed around the jacket of the inner core and also cabled together and enclosed in a second thermoplastic jacket. In another aspect of the invention, secondary fillers are placed with each group of twisted pairs to control shape and position. In another aspect of the invention, a limited number of pair lengths are used.

In another aspect of the present invention, a third grouping of twisted pairs is formed about the jacket of the second grouping and cabled together within a third thermoplastic jacket.

With these and other objects, advantages and features of the invention that may become apparent, the nature of the invention may be more clearly understood by reference to the following detailed description of the invention, the appended claims and the several drawings attached hereto.

DETAILED DESCRIPTION OF PREFERRED EMBODIMENTS

Figure 1:
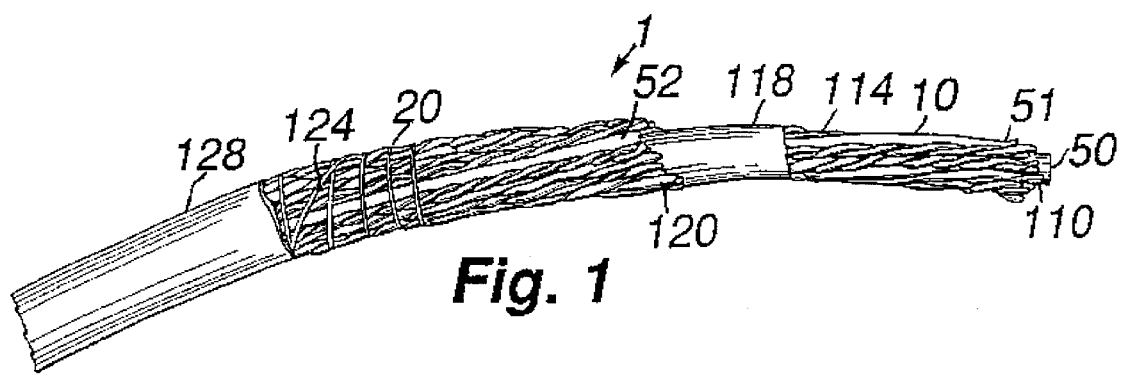
FIG. 1 is an illustration of a data communication cable according to a first embodiment of the present invention.

As illustrated in FIG. 1, a data communications cable 1 according to the present invention includes a first group 10 of twisted pair wires 110 and a second group 20 of twisted pair wires 120. The first group 10 includes nine twisted pair wires 110 grouped in a single layer about a filler 50. Only five lay lengths, from 0.400 inches to 0.750 inches, are used for the nine twisted pair wires. A secondary filler 51 is placed with the twisted pair wires 110 to control wire position and maintain a round shape. The twisted pair wires 110 are, preferably, of two number 24 AWG (solid) bare copper wire with thermoplastic insulation. The nine twisted pair wires 110 and secondary filler 51 are cabled together with a nylon binder 114 and enclosed in a thermoplastic jacket 118. The jacket 118 has a thickness of approximately 0.02 inches and a diameter of approximately 0.34 inches. Preferably, the filler 50 and secondary filler 51 are formed of an insulating material. Alternativey, the filler 50 and secondary filler 51 can be formed of bundles of optical fibers. The optical fibers would form a fiber optic cable which can be used for additional data communication capacity.

A second group 20 of twisted pair wires 120 is formed concentrically about the jacket 118 of the first group 10. The second group 20 of 16 twisted wire pair wires 120 having only four pair lengths, from 0.450 inches to 0.750 inches. As with the first group 10, the twisted pair wires 120 of the second group 20 are cabled together with a nylon binder 124 and enclosed in a thermoplastic jacket 128. The thermoplastic jacket 128 has a diameter of approximately 0.52 inches and a thickness of approximately 0.02 inches. A secondary filler 52 is also included in the grouping to control wire placement and roundness. Secondary filler 52 may also be formed of a bundle of optical fibers for additional communication capability.

Shielding of a known type can be used in addition to the thermoplastic jacket 128. Shielding can include helically wrapped foil in single or multiple layers, longitudinally wrapped foil, and metal wire braid. If shielding is used, the twisted pair wires typically would be wrapped with an insulating layer inside the shielding layer. Additional insulating layers can also be included between the shielding layer and the outer jacket.

Figure 2:
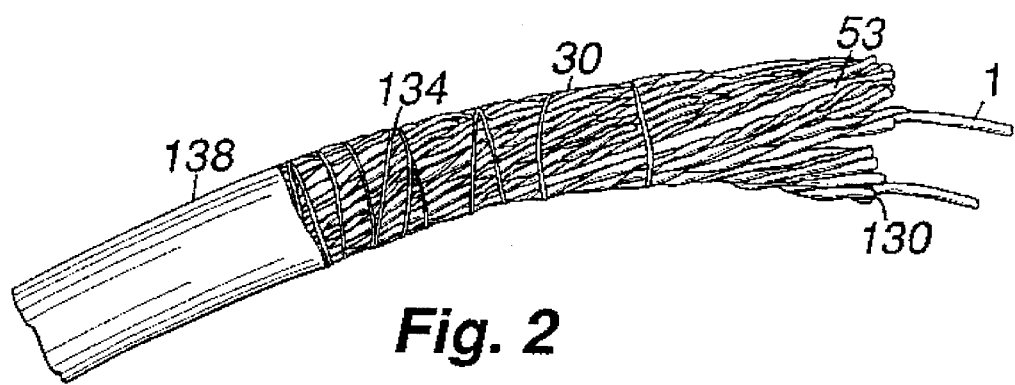
FIG. 2 is a data communication cable according to a second embodiment of the present invention.

A second embodiment of the present invention is illustrated in FIG. 2. The second embodiment includes a third group 30 of twisted pair wires 130 formed around a cable according to the first embodiment. The third grouping includes 25 twisted pair wires 130 having four lay lengths, from 0.450 inches to 0.750 inches. The third group 30 is cabled together with a nylon binder 134 and enclosed in a thermoplastic jacket 138. The jacket 138 has a diameter of approximately 0.70 inches and the same thickness of approximately 0.02 inches. As with the first two groups, the third group 30 includes a secondary filler 53 to provide roundness and placement control. The secondary filler 53 may also include a bundle of optical fibers. Shielding of a known type can also be used outside the third group of wires.

The number and lengths of the lays in each group of twisted pair wires are related to the characteristics of the thermoplastic jacket surrouding the group. The lengths recited herein are by way of example for a thermoplastic jacket having a thickness of approximately 0.02 inches. The variation in lengths would be increased if the jacket thickness were diminished in order to limit crosstalk.

Although preferred embodiments are specifically illustrated and described herein, it will be appreciated that modifications and variations of the present invention are covered by the above teachings and within the purview of the appended claims without departing from the spirit and intended scope of the invention.

What is claimed is:

1. A data cable comprising:

a central core;

a first plurality of twisted pair wires about said central core;

a first jacket about said first plurality of twisted pair wires;

a second plurality of twisted pair wires about said first jacket;

a second jacket about said second plurality of twisted pair wires.

2. A data cable according to claim 1, further comprising a first filler between two twisted pair wires of said first plurality of twisted pair wires.

3. A data cable according to claim 2, wherein said first filler is a fiber optic cable.

4. A data cable according to claim 2, further comprising a second filler between two twisted pair wires of said second plurality of twisted pair wires.

5. A data cable according to claim 4, wherein said second filler is a fiber optic cable.

6. A data cable according to claim 4, further comprising a third filler between two twisted pair wires of said third plurality of twisted pair wires.

7. A data cable according to claim 6, wherein said third filler is a fiber optic cable.

8. A data cable according to claim 1, further comprising a first binder wound about said first plurality of twisted pair wires and inside said first jacket.

9. A data cable according to claim 8, further comprising a second binder wound about said second plurality of twisted pair wires and inside said second jacket.

10. A data cable according to claim 9, further comprising a third binder wound about said third plurality of twisted pair wires and inside said third jacket.

11. A data cable according to claim 1, wherein lay lengths of said third plurality of twisted pair wires are in the range of 0.4 inches to 0.75 inches.

12. A data cable according to claim 1, further comprising:

a third plurality of twisted pair wires about said second jacket;

a third jacket about said third plurality of twisted pair wires.

13. A data cable according to claim 1, wherein said central core is an insulating filler.

14. A data cable according to claim 1, wherein said central core is a fiber optic cable.

15. A data cable according to claim 1 wherein said central core is cylindrical.

16. A data cable according to claim 1, wherein said first plurality includes nine twisted pair wires.

17. A data cable according to claim 1, wherein said second plurality includes sixteen twisted pair wires.

18. A data cable according to claim 1, wherein said third plurality includes twenty-five twisted pair wires.

19. A data cable according to claim 1, wherein lay lengths of said first plurality of twisted pair wires are in the range of 0.4 inches to 0.75 inches.

20. A data cable according to claim 1, wherein lay lengths of said second plurality of twisted pair wires are in the range of 0.4 inches to 0.75 inches.

* * * * *